United States Patent [19]

Yazaki et al.

[11] 4,311,392
[45] Jan. 19, 1982

[54] THICKNESS MEASURING APPARATUS FOR NON-METALLIC SHEET-SHAPED BODIES

[75] Inventors: Susumu Yazaki, Hachioji; Takeshi Matsumura, Kodaira, both of Japan

[73] Assignee: Bridgestone Tire Company Limited, Tokyo, Japan

[21] Appl. No.: 185,641

[22] Filed: Sep. 9, 1980

[30] Foreign Application Priority Data

Sep. 21, 1979 [JP] Japan ................................ 54-120801

[51] Int. Cl.³ ...................... G01B 11/06; G01B 11/14
[52] U.S. Cl. .................................. 356/375; 250/560; 356/381
[58] Field of Search ........................... 356/381-382, 356/375-376, 1; 250/560

[56] References Cited

U.S. PATENT DOCUMENTS

| | | | |
|---|---|---|---|
| 2,773,412 | 12/1956 | Huck | 356/382 |
| 3,667,283 | 6/1972 | Takenaka et al. | 250/560 |
| 3,697,867 | 10/1972 | Kleesattel | 324/207 |
| 3,713,739 | 1/1973 | Zarezankov et al. | 250/560 |
| 4,078,171 | 3/1978 | Stauffer | 250/201 |
| 4,207,003 | 6/1980 | Niemiro | 356/382 |
| 4,226,536 | 10/1980 | Dreyfus et al. | 356/376 |

*Primary Examiner*—William H. Punter
*Attorney, Agent, or Firm*—Sughrue, Mion, Zinn, Macpeak & Seas

[57] ABSTRACT

A thickness measuring apparatus for non-metallic sheet-shaped bodies formed of rubber, plastic or the like which is simple in construction and small in size and can accurately measure the thickness of the non-metallic sheet-shaped body irrespective of high temperature change. It comprises a sheet position detecting mechanism including a light detector for receiving an image of the surface of the non-metallic sheet-shaped body and scanning the image and operative to detect the surface position of the sheet-shaped body on the basis of the output from the light detector. A roll position detecting mechanism detects that surface position of a metal roll which lies near the surface position of the sheet-shaped body to be detected. A processing mechanism calculates the thickness of the sheet-shaped body on the basis of the surface positions of the sheet-shaped body and the metal roll.

5 Claims, 8 Drawing Figures

FIG_3
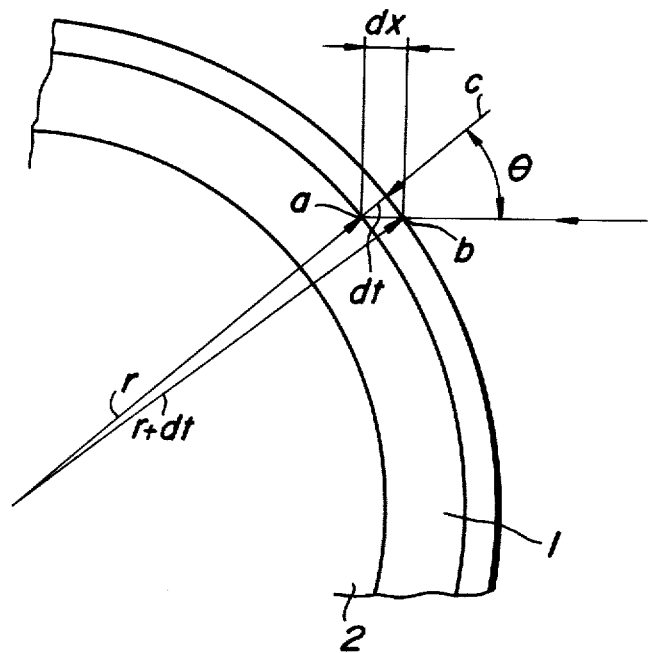
FIG_4A
FIG.4B
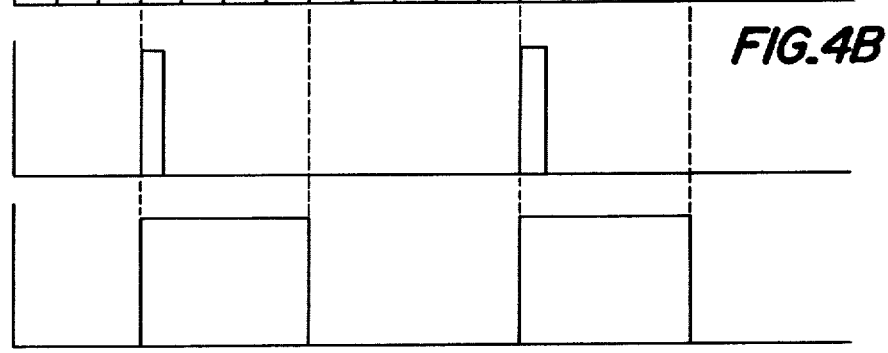
FIG_4C

THICKNESS MEASURING APPARATUS FOR NON-METALLIC SHEET-SHAPED BODIES

BACKGROUND OF THE INVENTION

1. Field of the Invention

This invention relates to a thickness measuring apparatus for non-metallic sheet-shaped bodies formed of rubber, plastic or the like.

2. Description of the Prior Art

As such kind of thickness measuring apparatus, the following non-contact type thickness measuring apparatus which makes use of radiation, light beam, electrostatic capacity type displacement meter or the like have therefore been proposed.

In the conventional thickness measuring apparatus which makes use of radiation, $\beta$-ray, X-ray or the like, radiation is incident upon a non-metallic sheet-shaped body and the thickness thereof is measured on the basis of the rate of attenuation of the amount of radiation transmitted through the sheet-shaped body.

In the conventional thickness measuring apparatus which makes use of light beam, the light beam is incident upon the surface of a non-metallic sheet-shaped body and this surface position is detected on the basis of the light reflected therefrom to measure the thickness thereof.

In the conventional thickness measuring apparatus which makes use of the electrostatic capacity type displacement meter, a change of the electrostatic capacity corresponding to change of the surface position of the non-metallic sheet-shaped body is detected to measure the thickness thereof.

The conventional thickness measuring apparatus which makes use of the radiation, however, has the disadvantage that the apparatus is expensive and is large in size as operators must effectively be prevented from being exposed to the radiation and that if the radiation absorption coefficient of the non-metallic sheet-shaped body is not uniform, the error becomes large, and as a result, it is impossible to accurately measure the thickness thereof.

The conventional thickness measuring apparatus which makes use of the light beam is constructed such that not only the surface position of the non-metallic sheet-shaped body but also the rear surface position thereof are optically detected to measure the thickness of the sheet-shaped body. As a result, the apparatus has the disadvantage that the optical system is complex in construction, that the apparatus as a whole is large in size, and that apparatus takes up a large amount of space. In addition, it is required to define a reference position for the purpose of detecting the upper and lower surface positions of the non-metallic sheet-shaped body. As a result, if the non-metallic sheet-shaped body is considerably displaced in its thickness-wise direction, it is difficult to define the reference position.

The conventional thickness measuring apparatus which makes use of an electrostatic capacity displacement meter has the disadvantage that the measurement error becomes large when temperature changes, so that the thickness could not accurately be measured. Also, it is difficult to define the reference position in the same manner as in the conventional thickness measuring apparatus which makes use of the light beam. As a result, it is impossible to use such conventional thickness measuring apparatus in the case of measuring the thickness of a rubber sheet adapted for use in manufacturing tires at a high temperature.

SUMMARY OF THE INVENTION

An object of the invention, therefore, is to provide a thickness measuring apparatus for non-metallic sheet-shaped bodies which can eliminate the above mentioned drawbacks which have been encountered with the prior art techniques and which is simple in construction and small in size and can measure the thickness of the non-metallic sheet-shaped bodies in an easy and highly accurate manner.

A feature of the invention is the provision of a thickness measuring apparatus for non-metallic sheet-shaped bodies comprising a projector for illuminating the surface of a non-metallic sheet-shaped body engaged with a metal roll, a sheet position detecting mechanism including a light detector for receiving an image of the surface of the non-metallic sheet-shaped body and scanning the image and operative to detect the surface position of the non-metallic sheet-shaped body on the basis of the output from the light detector, a roll position detecting mechanism for detecting that surface position of the metal roll which lies near the surface position of the non-metallic sheet-shaped body to be detected, and a processing mechanism for calculating the thickness of the non-metallic sheet-shaped body on the basis of the surface positions of the non-metallic sheet-shaped body and of the metal roll as detected by the sheet position detecting mechanism and roll position detecting mechanism, respectively, and delivering the thickness as an output, whereby the thickness of the non-metallic sheet-shaped body is measured while the sheet-shaped body travels across the metal roll.

Further objects and features of the invention will be fully understood from the following detailed description with reference to the accompanying drawings, wherein:

BRIEF DESCRIPTION OF THE DRAWINGS

FIG. 3 is a diagrammatic view showing change in a surface position of a non-metallic sheet-shaped body and change in light reflection position;

FIG. 4A is a graph showing light pulses delivered from a projector shown in FIG. 2;

FIG. 4B is a graph showing scanning pulses delivered from a driving circuit shown in FIG. 2;

FIG. 4C is a graph showing gate signals delivered from a light detector shown in FIG. 3;

DETAILED DESCRIPTION OF THE PREFERRED EMBODIMENTS

Figure 1:
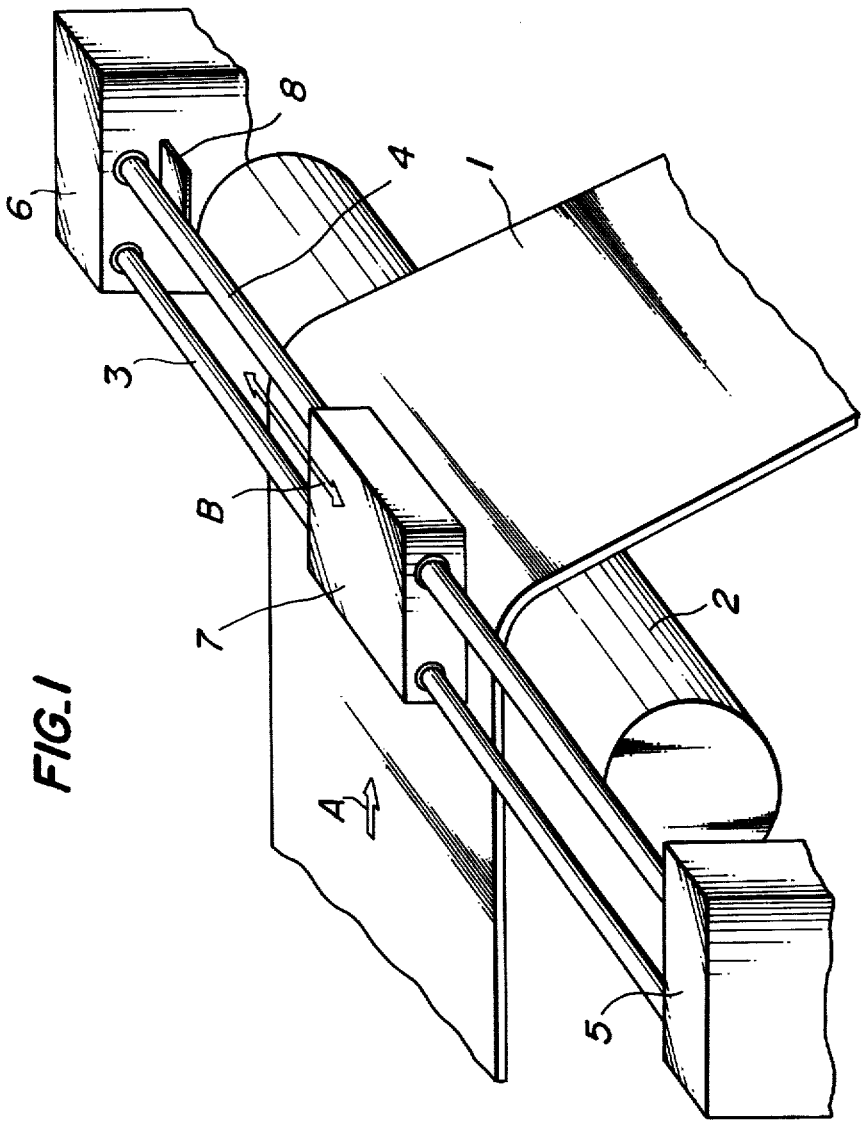
FIG. 1 is a perspective view of an embodiment of a thickness measuring apparatus for non-metallic sheet-shaped bodies according to the invention.

FIG. 1 shows an embodiment of a thickness measuring apparatus for non-metallic sheet-shaped bodies according to the invention. A non-metallic sheet-shaped body (which will hereinafter be called as a sheet) 1 engages with the surface of a metal roll 2 and travels in a direction shown by an arrow A. The metal roll 2 may be constructed so as to positively drive the sheet 1 or so as to be frictionally driven by the sheet 1. Outside the metal roll 2 are arranged two guide shafts 3, 4 extending in substantially parallel with and along the center axis of the metal roll 2 and having ends secured to stationary stands 5, 6. On these guide shafts 3, 4 is movably mounted a detection head 7 provided therein with a projector, sheet position detecting mechanism and roll position detecting mechanism to be described later with reference to FIG. 2. That is, the detection head 7 is mounted on the guide shafts 3, 4 and movable in direction substantially perpendicular to the travelling direction of the sheet 1 as shown by arrows B. The detection head 7 is slidably mounted on the guide shafts 3, 4 so as to be reciprocated by a manual operation. Alternatively, on one of the stationary stands 5 or 6 is mounted a driving source which can automatically reciprocate the detection head 7 by means of a suitable mechanism such as a chain, sprocket wheel or by replacing one of the guide shafts 3 or 4 by a ball screw. In the present embodiment, the stationary stand 6 is provided at its front surface with a correction plate 8 projected therefrom to a position near the end of the metal roll 2 and having a surface located at substantially the same vertical level as the outer peripheral surface of the metal roll 2 and extending in the lengthwise direction of the metal roll 2. The position of the correction plate 8 is detected by the detection head 7 so as to vertical define reference positions for the sheet position detecting mechanism and roll position detecting mechanism. The correction plate 8 may preferably be formed of metal which is the same as that of the metal roll 2.

Figure 2:
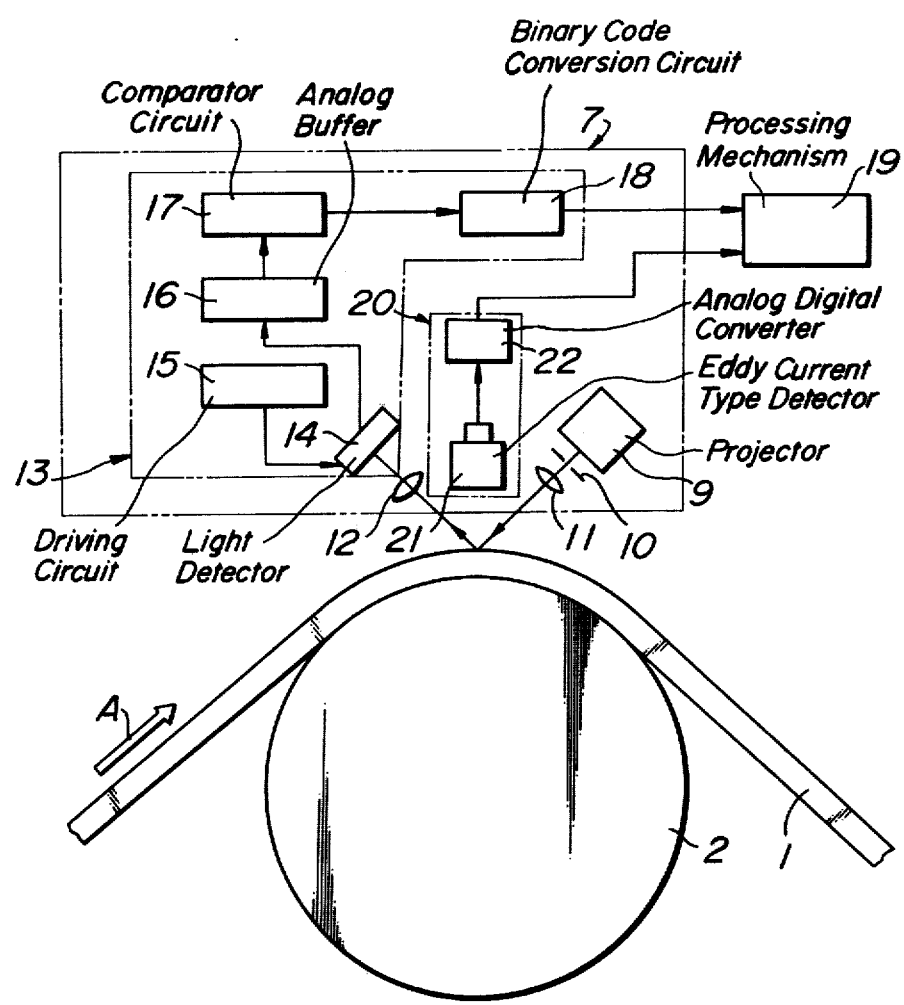
FIG. 2 is a diagrammatic view of essential parts of the apparatus shown in FIG. 1.

FIG. 2 shows essential parts of the thickness measuring apparatus shown in FIG. 1. A projector 9 may be composed of a laser, light emitting diode or the like. In the present embodiment, the projector 9 functions to periodically emit a pulse light and an image of a slit 10 is focussed through a projection lens 11 onto the surface of the sheet 1 engaged with the metal roll 2.

The image of the slit 10 is focussed by lens 12 on the light receiving surface of a light detector 14 which is a constitutional element of a sheet position detecting mechanism 13. Light emitted from the projector 9 is not always necessary to be a visible ray. The opening of the slit 10 may be made circular in shape, but it is preferable that the slit 10 is provided with a rectangular opening extending in the axial direction of the metal roll 2 and having a suitable length. The light detector 14 is composed of an array of a number of charge storage type light receiving elements arranged side by side and having a scanning ability such as a charge coupled device, bucket brigade device or the like. If the slit 10 has the rectangular opening extending in the axial direction of the metal roll 2 and having the suitable length, the light detector 14 is arranged such that the light reflected from the sheet 1 is focussed on different light receiving elements of the light detector 14 in response to change in thickness of the sheet 1 in a direction perpendicular to the lengthwise direction of the rectangular opening of the slit 10.

The sheet position detecting mechanism 13 comprises the above mentioned light detector 14, a driving circuit 15 for scanning the light detector 14 with a suitable timing, a comparator circuit 17 connected through an analog buffer 16 to the light detector 14 and operative to compare 1 line output delivered from the light detector 14 and received through the analog buffer 16 with a given level in succession, and a binary code conversion circuit 18 for converting 1 line output from the comparator circuit 17 into a binary code. An output from the binary code conversion circuit 18 is supplied to a processing circuit 18.

FIG. 3 shows a relation between the thickness of the sheet 1 and the light reflection position. If that position of the sheet 1 on which is formed the image of the slit 10 is changed from a position a to a point b, the image formation position on the light detector 14 is changed by dx in response to the change of the image formation position of the sheet 1 from the point a to the point b. In this case, the amount of change of the thickness dt of the sheet 1 is given $$dt = \sqrt{dx^2 + r^2 + 2dx \cdot r \cos\theta} - r$$

where r is a radius of curvature at the light reflection position a of the sheet 1 and $\theta$ is an incident angle with respect to a normal line C drawn to the image formation point a of the sheet 1, respectively. For example, let the number of elements of the light detector 14 by 1024 and the space between adjacent elements be 13 $\mu$m and the magnification of the projection lens 12 be 5×, then the image formation position on the light detector 14 is changed by dx = 13/5 $\mu$m = 2.6 $\mu$m. As a result, the image formation position on the light detector 14 is deviated by one light receiving element. Thus, if an image formation position corresponding to the surface position of the metal roll 2 is set beforehand as a reference position, the thickness of the sheet 1 can be obtained from the above mentioned formation of dt on the basis of the amount of deviation from the reference position to the image formation position measured in practice.

As seen from the above, the thickness of the sheet 1 can be measured by the sheet position detecting mechanism 13 only. But, the surface position of the metal roll 2 tends to be changed due to lack of uniformity thereof, load subjected thereto from the sheet 1, temperature change or the like. If the surface position of the metal roll 2 becomes changed, the practical reference position in the sheet position detection mechanism 13 is deviated, and as a result, it is impossible to accurately measure the thickness of the sheet 1.

In the present invention, in order to accurately measure the thickness of the sheet 1, provision is made of a roll position detection mechanism 20 as shown in FIG. 2 and that surface position of the metal roll 2 which lies near the surface position of the sheet 1 to be detected by the sheet position detecting mechanism 13 is detected by the roll position detecting mechanism. The roll position detecting mechanism 20 comprises an eddy current type detector 21 arranged in opposition to the metal roll 2 and an A/D converter 22 connected to the eddy current type detector 21 and operative to convert the analog output delivered from the detector 21 and corresponding to the distance from the surface of the metal roll 2 into a digital signal which is then supplied to the processing circuit 19. As a result, the processing circuit 19 is capable of accurately measuring the thickness of the sheet 1 on the basis of the surface position of the sheet 1 and the surface position of the metal roll 2 irrespective to the change of the surface position of the metal roll 2.

In the present embodiment, the roll position detecting mechanism 20 is incorporated into the detection head 7 so as to detect that surface position of the metal roll 2 which lies near the surface position of the sheet 1 to be detected by the sheet position detecting mechanism 13. In addition, the surface position of the correction plate 8 is detected periodically or at any desired time. The surface position of the correction plate 8 thus detected is stored as the reference position in the processing mechanism 19.

In this way, it is possible to effectively correct the change of the surface position of the metal roll 2 due to lack of uniformity thereof and due to load subjected thereto from the sheet 1. It is also possible to effectively correct the change of the output delivered from the eddy current type detector 21 due to the temperature change. As a result, it is possible to accurately measure the thickness of the sheet 1.

Let the distance between the eddy current type detector 21 and the surface position of the metal roll 2 be z and let the temperature be changed from t to t', then the output F(z) delivered from the roll position detecting mechanism 20 and corresponding to the surface position of the metal roll 2 changes from F(z) to F'(z). Here, F'(z) is given by $$F'(z) = F(z) + \Delta F$$

where $\Delta F$ is a measurement error.

If the surface position of the correction plate 8 is detected periodically or at any desired time with the aid of the roll position detecting mechanism 20 to correct the vertical reference position, it is possible to effectively correct the measurement error $\Delta F$ due to the temperature change at the time of detecting the surface position of the metal roll 2.

The successive operations of measuring the thickness of the sheet 1 by the above mentioned embodiment of an apparatus according to the invention will now be described. In the first place, the detection head 7 is moved to a position opposed to the correction plate 8. Then, the sheet position detecting mechanism 13 and the roll position detecting mechanism 20 are operated to measure the surface positions of the correction plate 8, respectively. Respective reference positions are stored in the processing mechanism 19. Then, the sheet 1 travels across the metal roll 2 in a direction shown by an arrow A. Subsequently, the detection head 7 is reciprocated in widthwise direction of the sheet 1 as shown by arrows B in FIG. 1 so as to detect the surface position of the sheet 1 and the surface position of the metal roll 2.

FIGS. 4A to 4C illustrate operation of the projector 9, driving circuit 15 and light detector 14 as a function of time at the time of detecting the surface position of the sheet 1. That is, FIG. 4A shows light pulses emitted from the projector 9 as a function of time, FIG. 4B shows scanning pulses delivered from the driving circuit 15 and for scanning the light detector 14 as a function of time, and FIG. 4C shows gate signals delivered to the analog buffer 16 as a function of time.

In the present embodiment, the electric charge stored in each light receiving element of the light detector 14 is subjected to sampling every 9 pulses and 1 line analog output thus obtained is supplied through the analog buffer 16 to the comparator circuit 17.

Figure 5A:
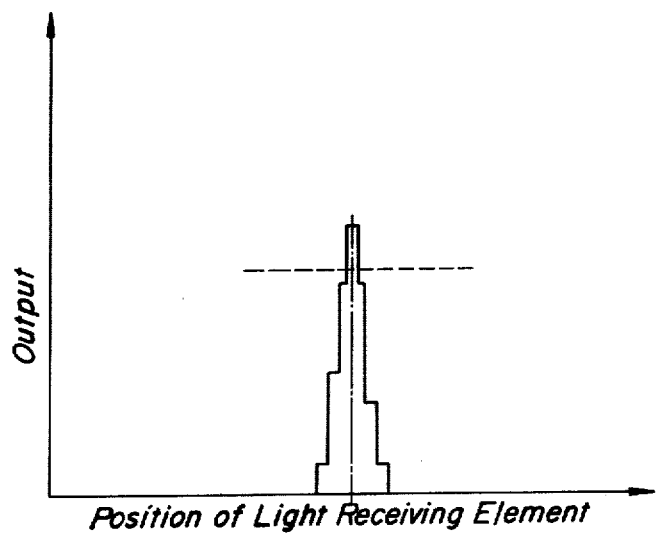
FIG. 5A is a graph showing a distribution of an output from a light detector shown in FIG. 2.

FIG. 5A shows the 1 line analog output delivered from the light detector 14 as a function of position of the light receiving elements in one array. As seen from FIG. 5A, the distribution of 1 line analog output delivered from the light detector 14 becomes different dependent on the position of the light receiving element. The output from the light receiving element located at the image formation position is the highest. This 1 line analog output is sliced at the comparator circuit 17 to a given threshold value level (shown by broken lines in FIG. 5A) to obtain a binary signal.

Figure 5B:
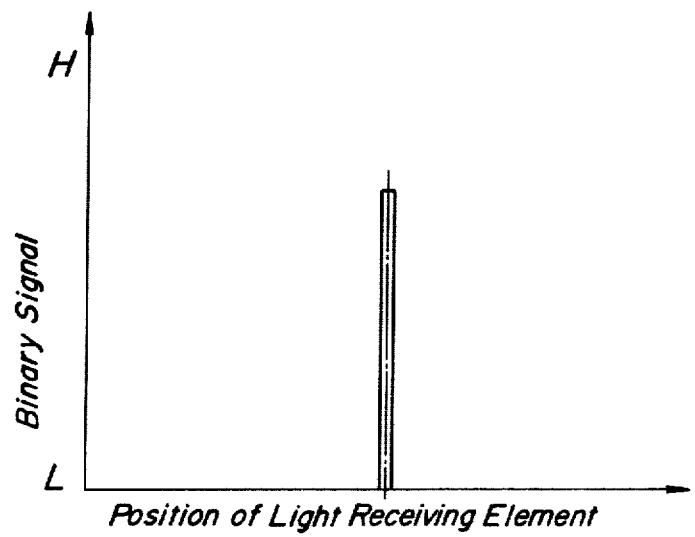
FIG. 5B is a graph showing a distribution of an output from a comparator circuit shown in FIG. 2.

FIG. 5B shows the binary signal as a function of position of light receiving element in one array. Among the light receiving elements each having H value, the value at the position x of the central element is supplied through the binary code conversion circuit 18 to the processing mechanism 19. The roll position detecting mechanism 20 functions to detect the surface position of the metal roll 2 while the sheet position detecting mechanism 13 functions to measure the thickness of the sheet 1. The output signal thus obtained is supplied to the processing mechanism 19. The processing mechanism 19 functions to calculate the practical surface position of the metal roll 2 on the basis of the reference position of the roll position detecting mechanism 20 which has been stored beforehand and the output signal delivered from the mechanism 20 and calculate the difference between the surface position of the metal roll 2 and the surface position of the sheet 1 calculated on the basis of the output signal delivered from the sheet position detecting mechanism 13. The difference thus calculated is supplied from the processing mechanism 19 as the practical thickness of the sheet 1 to a display device or recording device (not shown).

During the measurement, the detection head 7 is moved to the position opposed to the correction plate 8 periodically or at any desired time to correct respective reference positions of the sheet position detecting mechanism 13 and the roll position detecting mechanism 20. As a result, it is possible to correct the measurement error of the roll position detecting mechanism 20 due to the temperature change produced in the rolling step or the like of a rubber sheet under the circumstances where high temperature change occurs.

The invention is not limited to the above mentioned embodiment, but various changes or modifications may be made. For example, in the above mentioned embodiment, the electric charge stored in the light detector 14 is subjected to sampling every 9 light pulses. This sampling period may be shortened without degrading the resolving power with respect to the relative moving speed between the light detector 14 and the sheet 1. In addition, a continuous light beam may be emitted from the projector 9 instead of the pulse beam. The light detector 14 is composed of a charge storage type light receiving element such as a charge coupled device, bucket brigade device or the like, but may also be composed of a phototransistor. If the surface position at the end portion of the metal roll 2 is not so much changed due to the temperature or the load of the sheet 1, it is possible to use the end portion of the metal roll 2 in place of the correction plate 8.

The reference position may be selected at will. Separate reference positions may be set for the two detecting mechanisms and any desired position on the surface of the metal roll 2 may be set as the reference position. As a result, if the temperature change is small, the detection head 7 may be fixed at any desired position and that surface position of the metal roll 2 which is opposed to the detection head 7 may be set beforehand to a reference position and then the thickness of the sheet 1 may be measured.

As stated hereinbefore, the apparatus according to the invention is capable of making it simpler in construction and smaller in size if compared with the conventional thickness measuring apparatus and of measuring the thickness of a non-metallic sheet-shaped body in a highly precise manner even in a site where a high temperature change occurs.

What is claimed is:

1. A thickness measuring apparatus for non-metallic sheet-shaped bodies, comprising a projector for illuminating the surface of a non-metallic sheet-shaped body engaged with and traveling across a metal roll, a sheet position detecting mechanism including a light detector for receiving an image of the surface of said non-metallic sheet-shaped body and scanning said image, said sheet position detecting mechanism operative to detect the surface position of said non-metallic sheet-shaped body on the basis of the output from said light detector, a roll position detecting mechanism for detecting that surface position of said metal roll which lies near the surface position of said non-metallic sheet-shaped body to be detected, and a processing mechanism for calculating the thickness of said non-metallic sheet-shaped body on the basis of the surface position of said non-metallic sheet-shaped body and of said metal roll as detected by said sheet position detecting mechanism and roll position detecting mechanism, respectively, and delivering said thickness as an output, said projector, sheet position detecting mechanism and roll position detecting mechanism being incorporated into a detection head which is movably mounted on guide shafts extending in a direction perpendicular to the traveling direction of said non-metallic sheet-shaped body, whereby the thickness of said non-metallic sheet-shaped body is measured while said sheet-shaped body travels across said metal roll.

2. The apparatus according to claim 1, wherein said sheet position detecting mechanism comprises a light detector composed of an array of a number of charge storage type light receiving elements arranged side by side and having a scanning ability, a driving circuit connected to said light detector and for scanning it with a suitable timing, a comparator circuit connected through an analog buffer to said light detector and operative to compare 1 line output delivered from said light detector with a given level in succession, and a binary code conversion circuit connected to said comparator circuit and said processing mechanism and operative to convert 1 line output from said comparator circuit into a binary code and supply said binary code to said processing mechanism.

3. The apparatus according to claim 1, wherein said roll position detecting mechanism comprises an eddy current type detector arranged in opposition to said metal roll and an analog-digital converter connected to said eddy current type detector and said processing mechanism and operative to convert the analog output delivered from said detector and corresponding to the distance between said detector and the surface of said metal roll into a digital signal and supply said digital signal to said processing circuit.

4. The apparatus according to claim 3, wherein a measurement error of said roll position detecting mechanism is corrected by said processing mechanism on the basis of a reference surface position of a metal surface detected by said roll position detecting mechanism.

5. The apparatus according to claim 1, wherein said light detector is composed of a charge storage type light receiving element such as a charge coupled device bucket brigade device, phototransistor or the like.

* * * * *